United States Patent [19]

Asrar

[11] Patent Number: 5,115,037
[45] Date of Patent: May 19, 1992

[54] HYDROGENATED CYCLIC ALKYL POLYMERS

[75] Inventor: Jawed Asrar, Chesterfield, Mo.

[73] Assignee: Monsanto Company, St. Louis, Mo.

[21] Appl. No.: 629,910

[22] Filed: Dec. 19, 1990

[51] Int. Cl.$^5$ ................................................ C08F 8/04
[52] U.S. Cl. ............................... 525/326.8; 525/338; 525/339; 526/259
[58] Field of Search ....................... 525/326.8; 526/259

[56] References Cited

U.S. PATENT DOCUMENTS

| | | | |
|---|---|---|---|
| 4,107,174 | 8/1978 | Baumann et al. | 526/259 |
| 4,163,097 | 7/1979 | Baumann et al. | 526/259 |
| 4,187,364 | 2/1980 | Darms et al. | 526/259 |
| 4,189,560 | 2/1980 | Roth et al. | 526/259 |
| 4,957,988 | 9/1990 | Irving et al. | 526/259 |
| 5,070,163 | 12/1991 | Stockinger et al. | 526/259 |

FOREIGN PATENT DOCUMENTS 0303246 2/1989
0317262 5/1989 European Pat. Off. .

*Primary Examiner*—Bernard Lipman
*Attorney, Agent, or Firm*—Thomas E. Kelley; Richard H. Shear

[57] ABSTRACT

Polyethylene cyclopentanedicarboximides, e.g. having an imide group which is alkyl, cycloalkyl or aryl, prepared by hydrogenation of a presursor polymer having olefinic unsaturation in the polymer backbone and derived from norbornene dicarboximide units. Such polyethylene cyclopentanedicarboximides exhibit a substantially higher thermo-oxidative stability then the unsaturated precursor polymer.

7 Claims, No Drawings

HYDROGENATED CYCLIC ALKYL POLYMERS

Disclosed herein are novel saturated cyclopentane dicarboximide polymers, i.e. polyethylene cyclopentanedicarboximides, exhibiting high thermooxidative stability prepared by hydrogenation of cyclic olefin polymers of norbornene dicarboximides.

BACKGROUND OF THE INVENTION

Metathesis ring-opening polymerization of norbornene monomers provides a variety of useful unsaturated cyclic olefin polymers such as norbornene dicarboximide polymers which exhibit advantageously high glass transition temperatures, low dielectric permittivity and good mechanical properties which commend their use in a variety of applications, e.g. in the electronics industry as substrates for supporting microelectronic circuits and as connectors. Because of the unsaturation in the polymer backbone, such polymers are not sufficiently stable to thermo-oxidative degradation for many high temperature applications. Although the oxidative stability of such polymers can be improved by conventional methods such as the incorporation of anti-oxidants, such additives often have an adverse effect on dielectric properties.

SUMMARY OF THE INVENTION

I have discovered that the hydrogenation of unsaturated norbornene dicarboximide polymers provides novel saturated cyclopentane dicarboximide polymers exhibiting glass transition temperatures ($T_g$) above 150° C. and substantially enhanced thermo-oxidative stability. The polymers of this invention comprise ethylene cyclopentane dicarboximide units having the structural formula

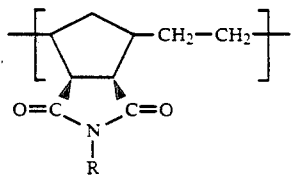

where R is alkyl, cycloalkyl, aryl.

Because the carbon bonds in the backbone of such polyethylene cyclopentanedicarboximides is saturated, the polymer has increased flexibility and thus a lower $T_g$ than the $T_g$ of the unsaturated precursor polymer from which it is produced. As used herein $T_g$ is determined in a differential scanning calorimeter at a heating rate of 20° C./minute. The $T_g$ of the saturated polymers of this invention is at least 5° C. lower than the $T_g$ of the corresponding unsaturated precursor polymer. Surprisingly, however the polyethylene cyclopentanedicarboximides of this invention can have sufficiently high $T_g$, depending on the imide substituent, to be advantageously useful for many high heat applications. For instance, saturated homopolymers where the imide group is methyl or cyclohexyl have a $T_g$ of about 165° C. and homopolymers where the imide group is a halophenyl, e.g. o-chlorophenyl, have a $T_g$ of about 200° C.

The oxidative stability of the polymers of this invention is determined by subjecting the polymer to increasing temperature (at a rate of 10° C./minute) in an oxygen atmosphere e.g. in a differential scanning calorimeter and recording the maximum exotherm temperature ($T_{ex}$) indicative of polymer oxidation. The saturated polymers of this invention exhibit substantially higher resistance to thermooxidative degradation than do the unsaturated precursor polymers. Preferred saturated polymers of this invention exhibit $T_{ex}$ at least 10° C. higher, more preferably at least 20° C. higher, than the $T_{ex}$ of the unsaturated precursor polymer. For instance, polyethylene N-cyclohexylnorbornene dicarboximide undergoes oxidation at a $T_{ex}$ of about 340° C., whereas the precursor polymer degrades at a $T_{ex}$ of about 210° C.

DETAILED DESCRIPTION OF PREFERRED EMBODIMENTS

The ethylene cyclopentanedicarboximide polymers of this invention can be a homopolymer or copolymer prepared by hydrogenating a precursor polymer having olefinic unsaturation in the polymer backbone and derived from norbornene dicarboximide units selected from the group consisting of N-methyl norbornene dicarboximide, N-ethyl norbornene dicarboximide, N-propyl norbornene dicarboximide, N-butyl norbornene dicarboximide, N-trifluoroethyl norbornene dicarboximide, N-phenyl norbornene dicarboximide, N-trifluoromethylphenyl norbornene dicarboximide, N-cyclopentyl norbornene dicarboximide, N-cyclohexyl norbornene dicarboximide, N-cycloheptyl norbornene dicarboximide, N-cyclooctyl norbornene dicarboximide and other imide monomers or, in the case of copolymers, non-imide metathesis polymerizable monomers such as norbornene nitrile.

The unsaturated precursor polymers useful in this invention can be simply prepared using well known metathesis ring-opening polymerization techniques, including melt polymerization and solution polymerization where the monomer is dissolved in solvent such as toluene or dichloroethane, using conventional metathesis polymerization catalysts such as tungsten hexachloride catalyst with aluminum alkyl accelerator or ruthenium chloride catalyst. Preferred catalyst systems are the non-pyrophoric catalysts, comprising ruthenium initiator and tungsten catalyst, disclosed by Hardiman in U.S. application Ser. No. 07/531,663, incorporated herein by reference. Because the N-cycloalkyl norbornene dicarboximide monomers have a melt point less than 150° C., such polymers are advantageously prepared by melt polymerization, e.g. in an extruder, using conventional metathesis polymerization catalyst systems. And, because certain of the norbornene dicarboximide monomers form eutectic mixtures, melt polymerization is possible at desireably low temperatures. For instance, copolymers of N-methyl and N-cycloalkyl norbornene dicarboximide are advantageously prepared by melt polymerization at temperatures lower than the melting point of either monomer, i.e. about 115° C. for N-methyl norbornene dicarboximide and about 140° C. for N-cyclohexyl norbornene dicarboximide. Monomer mixtures of about 25–70% N-cyclohexyl norbornene dicarboximide melt at temperatures of 85°–100° C. and monomer mixtures of about 50–60% N-cyclo-hexyl norbornene dicarboximide melt at eutectic temperatures of 85°–90° C. Such melt polymerization conducted at lower temperatures reduces the polymer's exposure to the potentially deleterious effects of higher temperature polymerization.

Hydrogenation can be effected by conventional methods well known to those skilled in the art of hydrogenating unsaturated polymers. In a convenient method, the hydrogenation is conducted in solution, e.g. of the precursor polymer and a reducing agent such as p-toluenssulfonyl hydrazide in a compatible solvent such as N-methylpyrrolidone.

EXAMPLE 1

This example illustrates a method of hydrogenating a precursor norbornene dicarboximide polymer, i.e. a homopolymer comprising N-cyclohexyl norbornene dicarboximide units ($T_g$ of 205° C. and $T_{ex}$ of 209° C.), to prepare a polyethylene N-cyclohexyl cyclopentanedicarboximide. 63 grams of the precursor polymer was dissolved in 1.5 liters of N-methyl pyrrolidone at about 25° C. followed by the addition of 220 grams of p-toluenesulfonyl hydrazide. Oxygen was removed from the solution by passing nitrogen through the solution. The precursor polymer was hydrogenated by maintaining the solution temperature at 110° C. for 8 hours. The polymer was precipitated in methanol, washed with water and dried in vacuum oven at 80° C. The recovered polymer was 98% hydrogenated (determined by $C^{13}$NMR) and had a $T_g$ of 164° C. and a $T_{ex}$ of about 340° C.

EXAMPLE 2

The procedure of Example 1 was repeated using a variety of different precursor polymers, i.e. homopolymers of N-methyl, N-o-fluorophenyl, and N-o-chlorophenyl norbornene dicarboximide units. The reduction of $T_g$ and increase of $T_{ex}$ is shown in the following Table.

| Imide Group | Precursor Polymer | | Hydrogenated Polymer | |
|---|---|---|---|---|
| | $T_g$ | $T_{ex}$ | $T_g$ | $T_{ex}$ |
| methyl | 210° C. | 165° C. | 204° C. | 232° C. |
| o-fluorophenyl | 239 | 193 | 225 | 252 |
| o-chlorophenyl | 260 | 216 | 225 | 276 |

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. Polyethylene cyclopentanedicarboximide.
2. Polyethylene cyclopentanedicarboximide according to claim 1 where the imide group is N-alkyl, N-cycloalkyl or N-aryl.
3. Polyethylene cyclopentanedicarboximide according to claim 1 comprising ethylene N-methyl cyclopentanedicarboximide units.
4. Polyethylene cyclopentanedicarboximide according to claim 1 comprising ethylene N-cyclohexyl cyclopentanedicarboximide units.
5. Polyethylene cyclopentanedicarboximide according to claim 1 comprising ethylene N-aryl cyclopentanedicarboximide units.
6. Polyethylene cyclopentanedicarboximide according to claim 1 comprising ethylene N-aryl cyclopentanedicarboximide units where the imide group is an orthosubstituted phenyl.
7. A polymer derived from a precursor polymer having olefinic unsaturation in the backbone and derived from norbornene dicarboximide units wherein olefinic unsaturation in the polymer backbone is reduced by hydrogenation of said precursor polymer sufficiently to reduce glass transition temperature by at least 5° C. and wherein the maximum exotherm temperature exhibited by the polymer when subjected to increasing temperature at a rate of 10° C./minute in an oxygen environment in a differential scanning calorimeter is increased by at least 10° C. over the maximum exotherm temperature of the precursor polymer.

* * * * *